United States Patent [19]

Umemoto

[11] Patent Number: 5,838,457
[45] Date of Patent: Nov. 17, 1998

[54] INDEX PRINTING APPARATUS INCLUDING EXPOSURE CONTROL MEANS

[75] Inventor: Choji Umemoto, Wakayama, Japan

[73] Assignee: Noritsu Koki Co., Ltd., Wakayama, Japan

[21] Appl. No.: 490,292

[22] Filed: Jun. 14, 1995

[30] Foreign Application Priority Data

Jun. 14, 1994 [JP] Japan .................................... 6-132100
Jun. 14, 1994 [JP] Japan .................................... 6-132101

[51] Int. Cl.⁶ ........................................................ H04N 1/23
[52] U.S. Cl. ........................ 358/302; 358/501; 358/527; 358/401; 358/450
[58] Field of Search .................................... 358/302, 527, 358/450, 296, 501, 401, 448; 355/54, 27, 35; 399/140, 141, 142

[56] References Cited

U.S. PATENT DOCUMENTS

| 4,903,068 | 2/1990 | Shiota | 355/20 |
| 4,933,773 | 6/1990 | Shiota | 358/302 |
| 5,184,227 | 2/1993 | Foley | 358/502 |
| 5,400,152 | 3/1995 | Manico et al. | 358/501 |
| 5,563,984 | 10/1996 | Tanibata | 355/40 |
| 5,649,263 | 7/1997 | Kojima | 355/27 |
| 5,652,661 | 7/1997 | Gallipeau et al. | 358/302 |
| 5,671,072 | 9/1997 | Umemoto | 358/501 |

FOREIGN PATENT DOCUMENTS 5-027406 2/1993 Japan .
5-045854 2/1993 Japan .

Primary Examiner—Peter S. Wong
Assistant Examiner—Derek J. Jardieu
Attorney, Agent, or Firm—Felfe & Lynch

[57] ABSTRACT

A photographic printing apparatus capable of printing, as an index print, an inlaid composite image having images of a plurality of frames of a film. An exposure device 10 of this printing apparatus includes an exposure controller 104 for controlling this exposure device 10 according to exposure conditions determined based on image information read from the film. The apparatus incorporates an index printer 40 for printing an inlaid composite image. An image information converter 103 is provided for producing, from the read image information, index-print image information corresponding to an image which is expected to be obtained on a photosensitive material if the material is exposed under the determined exposure conditions, and also for sending this index-print information to the index printer 40. A monitor 30 is provided for displaying the image information produced by the image information converter 103 for allowing checking thereof.

9 Claims, 17 Drawing Sheets

FIG. 14A image information reading
FIG. 14B film reverse transport
FIG. 14C correction instruction
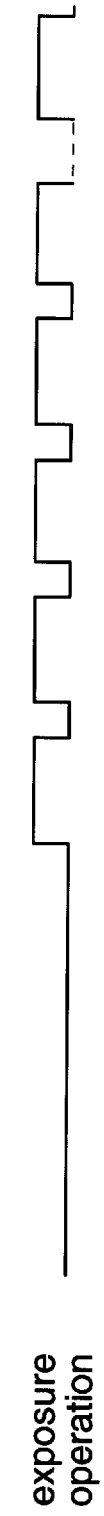
FIG. 14D exposure operation
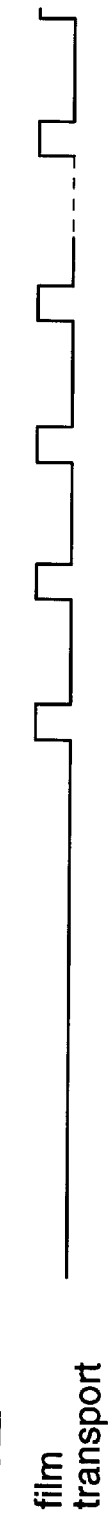
FIG. 14E film transport image information reading film reverse transport correction instruction exposure operation film transport

INDEX PRINTING APPARATUS INCLUDING EXPOSURE CONTROL MEANS

BACKGROUND OF THE INVENTION

1. Field of the Invention

The present invention relates to an index printing apparatus capable of producing, as an index print, an inlaid composite image composed of images of a plurality of film frames, and relates also to such index print produced by the apparatus.

2. Description of the Related Art

An index printing apparatus of the above-noted type is known from e.g. U.S.P. Ser. No. 5,184,227. This apparatus comprises a conventional photographic printing apparatus provided with an index printing function. Specifically, the photographic printing apparatus includes exposure means for exposing a photosensitive material for obtaining a photographic print, an exposure condition computing unit for computing exposure conditions for exposing the photographic material based on image information read from a film, an exposure control unit for controlling the exposure means according to the exposure conditions, and index printing means for printing an inlaid composite image. For obtaining an index print having high fidelity to photographic prints, an index printing process utilizes the exposure conditions computed by the exposure condition computing unit.

However, in order to meet an increasing users' demand for easier viewing of the index print, the mere utilization in the index printing process of the exposure conditions from the exposure condition computing means is not sufficient.

Further, the conventional index printing apparatus has another function of allowing printing film frame numbers in superposition with the images of these film frames, so as to allow a viewer to understand at least the corresponding relationship between the image information printed on the index print and the image information of the film. However, the information printable by this apparatus basically relates to the film images alone. For instance, the apparatus does not allow printing of such desired information as the location of photography which information relates commonly to the image information of the plurality of film frames.

SUMMARY OF THE INVENTION

An object of the present invention is to provide a photographic printing apparatus with the index printing function, which allows prediction and preliminary checking of an index print image to be obtained.

A further object of the invention is to provide an index printing apparatus which allows printing of desired additional information in addition to the image information of the film.

A still further object of the invention is to provide an index printing apparatus capable of producing an index print in which an image display area for displaying images of film frames and an additional information display area for displaying the additional information inputted as desired are arranged appropriately to each other within a single sheet of the print.

Then, a photographic printing apparatus provided with the index printing function, according to the present invention, comprises: an image information converter unit for converting read image information into image information corresponding to an image which is expected to be formed on a photosensitive material if the material is exposed under exposure conditions determined by an exposure condition determining unit which per se is known; and a monitor for displaying the image information produced by the image information converter unit; wherein, the image information converter unit produces index-print image information from the read image information by utilizing the determined exposure conditions and sending this index-print image information to index printing means.

With the photographic printing apparatus described above, the exposure condition computing unit determines the exposure conditions based on the image information read from a film; then, the image information converter unit effects a conversion operation of the read image information to simulate an image which is expected to be obtained on the photographic material if this photographic material is exposed under the determined exposure conditions. This simulated image is displayed on the monitor to allow an operator to judge e.g. appropriateness of the determined exposure conditions.

The exposure conditions determined by the exposure condition computing unit are used also in a so-called index printing process for printing images of a plurality of film frames on to a single sheet of print material. The index printing process effected in the above manner ensures maximum fidelity of the resulting index print as printed out to the images obtained by the exposure of the photosensitive material under the exposure conditions determined by the exposure condition computing unit. Accordingly, by observing the monitor display, the operator may judge, at the same time, whether the exposure conditions for the photosensitive material and conditions for producing the index print are appropriate or not.

According to one embodiment of the invention, the apparatus further comprises correction instruction input means for providing a correction instruction to the exposure condition computing unit in order to correct the exposure conditions once determined by this computing unit. With this construction, the operator may be provided with the possibility of inputting an exposure-condition correction instruction from the correction instruction input means if the operator viewing the simulated image on the monitor display determines the necessity of exposure condition correction. Then, with reception of this correction instruction, the exposure condition computing unit effects a correction computation based on the instruction to produce new exposure conditions. These corrected exposure conditions determined with the input of the correction instruction are used also in the index printing process. Hence, the index print will be produced by utilizing the new exposure conditions corrected based on the correction instruction inputted by the operator observing the monitor display.

According to a further embodiment of the invention, the apparatus allows selection between two operation modes, i.e. a correction-completed mode in which the index printing process by the index printing means is effected only after reception of an correction instruction from the correction instruction input means, and a correction-uncompleted mode in which the index printing process by the index printing means is effected without any correction. In this case, if the photographic printing apparatus is set to the correction-completed mode, the apparatus may produce an index print using the corrected exposure conditions. If set to the correction-uncompleted mode, the apparatus will produce an index print on the conditions before a correction instruction from the operator. In this case, instead of observing the monitor display, the operator may check this index print to determine which frame requires an exposure condition correction.

Further, an image composer unit which is needed for the index printing operation for producing composite image information of images of a plurality of film frames, may be selectably provided either within the image information converter unit or to the index printing means. In the former case, the composite image having the images of the plural film frames, i.e. the original image of the index print, may be directly displayed on the monitor. In the latter case, the composite image is produced within the index printing means. Thus, the image information converter unit may be that used in a conventional photographic printing apparatus not having the index printing function. As a result, if the conventional photographic printing apparatus without the index printing function is connected newly with this index printing means, this apparatus will be afforded with substantially the same function as provided by the apparatus of the present invention.

As described above, for an index printing operation, the apparatus needs the first image composing means for producing an inlaid composite image for an index print from image information read from a film and also the index printing means for printing this inlaid composite image. Further, for producing an index print having additional information besides the image information of the film, an index printing apparatus of the present invention further comprises: additional information input means for inputting the additional information to be added in the index print; and second image composer means for composing the additional information inputted from the additional information input means with the inlaid composite image produced by the first image composer means; wherein, the index printing means prints out, as an index print, the image information sent from the second image composer means. It is proposed that the additional information comprise various kinds of information such as information of the photographic location and/or the photographic subject which information relates commonly to the image information of the plural film frames or information concerning the manufacturer of the index print. The kind of the additional information to be inputted from the additional information input means may vary conveniently. For instance, if the index print has the additional information concerning the photography location commonly relating to the plurality of frames, a customer may grasp at once the recorded contents of the film only by viewing this index, print. With this function allowing printing of desired additional information, the apparatus of the invention may produce an index print which may be conveniently used by the user.

According to a still further aspect of the invention, the apparatus further comprises: a memory for storing the kinds of additional information, preferably characters or images denoting the kinds, which may be inputted from the additional information input means; and designating means for designating the kind of the additional information. In this case, the input operation of the additional information may be effected readily and more reliably.

The present invention further provides an index print in which images of a plurality of film frames are inlaid in proximity to each other within a single sheet of the print. Then, according to the invention, the index print comprises an image display area defined for printing the images of plural film frames, and an additional information display area for displaying additional information provided independently of the film image information, the additional display area being defined between an edge of the image display area and an edge of the sheet by partially extending a distance between the edges. This additional information may comprise either or both of character information and image information. In this, it is preferred that the additional information display area be encircled by a frame for highlighting its display.

Further and other objects, features and effects of the invention will become more apparent from the following more detailed description of the embodiments of the invention with reference to the accompanying drawings.

BRIEF DESCRIPTION OF THE DRAWINGS

FIGS. 14A to 14E show parallel timing charts relating to the embodiment.

DESCRIPTION OF THE PREFERRED EMBODIMENTS

A photographic printing apparatus, as one preferred embodiment of the present invention, will be described in particular with reference to the accompanying drawings.

Figure 1:
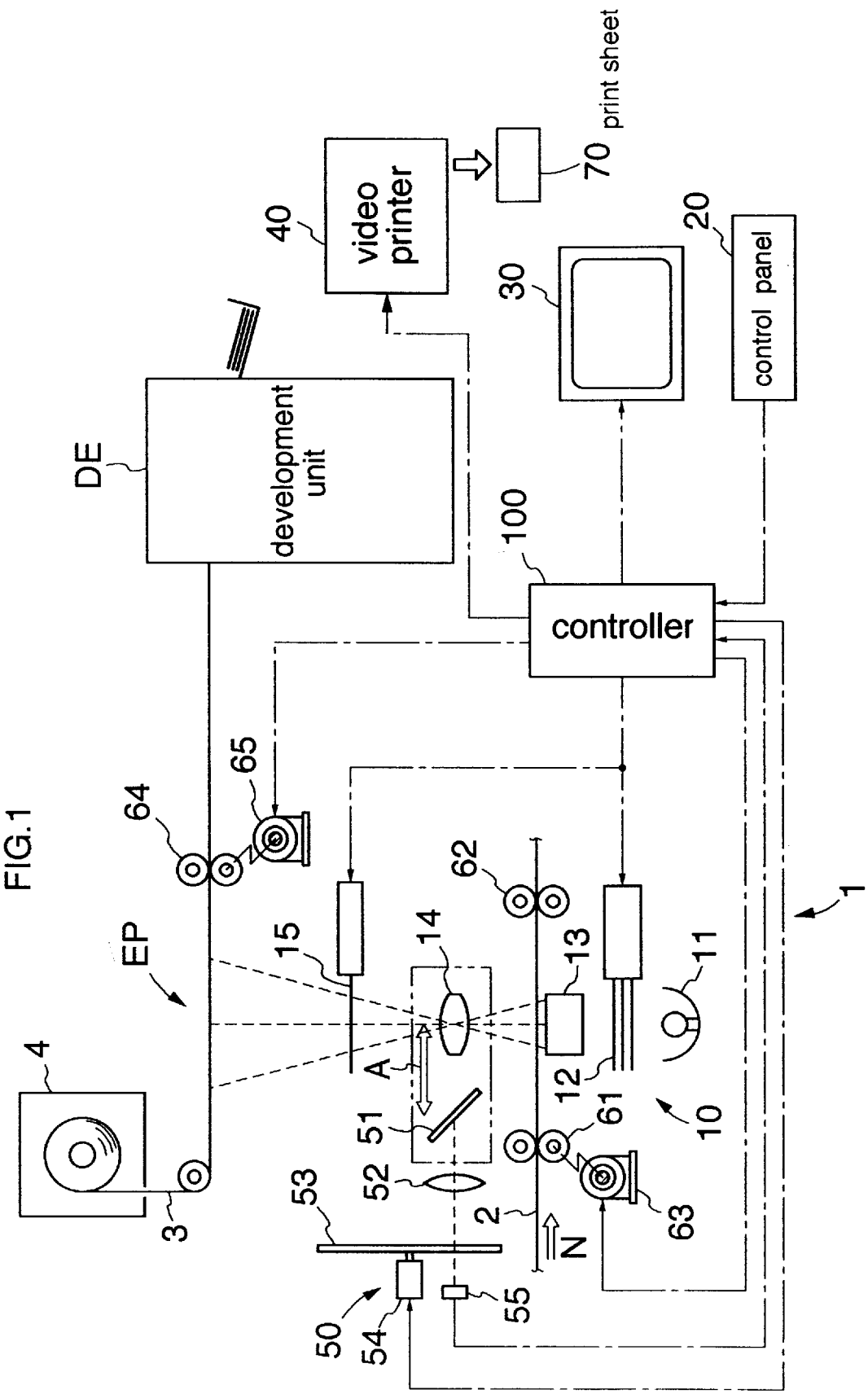
FIG. 1 is a schematic construction view relating to one preferred embodiment of a photographic printing apparatus according to the present invention.

As shown in FIG. 1, a photographic printing apparatus 1 includes an exposure means 10 for projecting and exposing image information of a film 2 on to a print paper 3 as a photosensitive material, a development unit 5 for developing the print paper 3 exposed by the exposure means 10, and a controller 100 for controlling operations of various components of this photographic printing apparatus 1. The controller 100 is connected with a control panel 20 for effecting a variety of instruction inputs and mode setting operations, a monitor 30 for displaying image information and also with a video printer 40 for producing a hard copy of the image information. In order to facilitate the various operations, the control panel 20 includes, in addition to operation keys, various input devices such as a keyboard, a trackball and so on.

This photographic printing apparatus has the dual function i.e. a function as a photographic printer in which a print paper 3 withdrawn from a print paper magazine 4 storing the paper 3 in a rolled state is exposed by the exposure means 10, developed at the development unit 5 and then severed into a size containing one-frame amount of image information, and a further function as an index printer in which image information of a plurality of frames of the film 2 and additional information are together printed on an index print sheet 70 as a printing material to produce an index print.

Next, the respective components of the apparatus will be described.

The exposure means 10 includes a light source 11, a light modulating filter 12 for adjusting color balance of the light irradiated on to the film 2, a mirror tunnel 13 for uniformly mixing the light past the light modulating filter 12, a printing lens 14 for forming the image of the film 2 on the print paper 3, and a shutter 15. And, these components are aligned along an optical axis as the exposure light path.

Beside the printing lens 14, there is disposed a reader device 50 for reading the image information of the film 2. This reader device 50 includes a reflecting mirror 51, a lens 52, a rotary color filter 53 including peripherally R (red), G (green) and B (blue) color filters, a motor 54 for rotatably driving the rotary color filter 53, and a CCD image sensor 55. And, as this reader device 50 is connected with the controller 100, the information read by the device is sent to the controller 100 to be processed thereby and the operations of this reader device 50 are controlled by the controller 100.

The reflecting mirror 51, together with the printing lens 14, is mounted on an unillustrated movable deck.

Then, as the movable deck mounting the printing lens 14 and the reflecting mirror 51 is slided in a direction of arrow A in FIG. 1, there are selectively provided a condition where the printing lens 14 is located on the exposure light path and a further condition where the reflecting mirror 51 is located on the exposure light path.

When the printing lens 14 is located on the exposure light path, image information of the film 2 is formed on the print paper 3 by this printing lens 14. Whereas, when the reflecting mirror 51 is located on the exposure light path, the image information of the film 2 is reflected by this reflecting mirror 51 and then formed on a light receiving face of the CCD image sensor 55 by the lens 52.

The CCD image sensor 55 detects the image information of the film 2 with the information being separated into the R, G, B components in association with rotation of the rotary color filter 53.

In the transport passage of the film 2, a roller 61 is disposed upstream and a further roller 62 is disposed downstream, respectively. These rollers 61, 62 are driven by a motor 63 in correlation with each other.

With the photographic printing apparatus 1 described above, when the reflecting mirror 51 is located on the exposure light path, image information of the film 2 is read by the CCD image sensor 55. On the other hand, when the printing lens 14 is located on the exposure light path, the image information of the film 2 is printed on to the print paper 3. Downstream of an exposing position B of the print paper 3 in the transport passage of the print paper 3, there are disposed a roller 64 for transporting the print paper 3 and a motor 65 for driving this roller 64.

Though not shown, the development unit 5 includes a plurality of tanks filled with processing liquids for the development of the print paper 3 after its exposure, such that as the print paper 3 is caused to pass these tanks one after another, the paper is developed.

The video printer 40 connected to the controller 100 is for printing, on a single index print sheet 70 as a printing material, the image information of a plurality of film frames included in video signals transmitted from the controller 100, thereby to produce a so-called index print.

The video printer 40 effects its printing operation either when the printer 40 receives a printing instruction from the control panel 20 or when the printer 40 receives an automatic printing instruction from the controller 100. And, when the controller 100 provides the automatic printing instruction, there are selectively provided two modes, i.e. a correction-uncompleted mode in which the printing instruction is issued before an operator inputs a correction instruction for exposure conditions via the control panel 20, and a correction-completed mode in which the printing instruction is issued only after the operator has inputted a correction instruction for exposure conditions via the control panel 20.

Incidentally, the video printer 40 may comprise a printer of any type capable of color printing such as the thermal transfer type, the direct heat sensitive type, the CRT type or laser type, the ink jet type, the electrostatic type and so on. Further, in case the printer comprises a monochrome printer, it is preferred that this monochrome printer be capable of half-tone printing.

Figure 2:
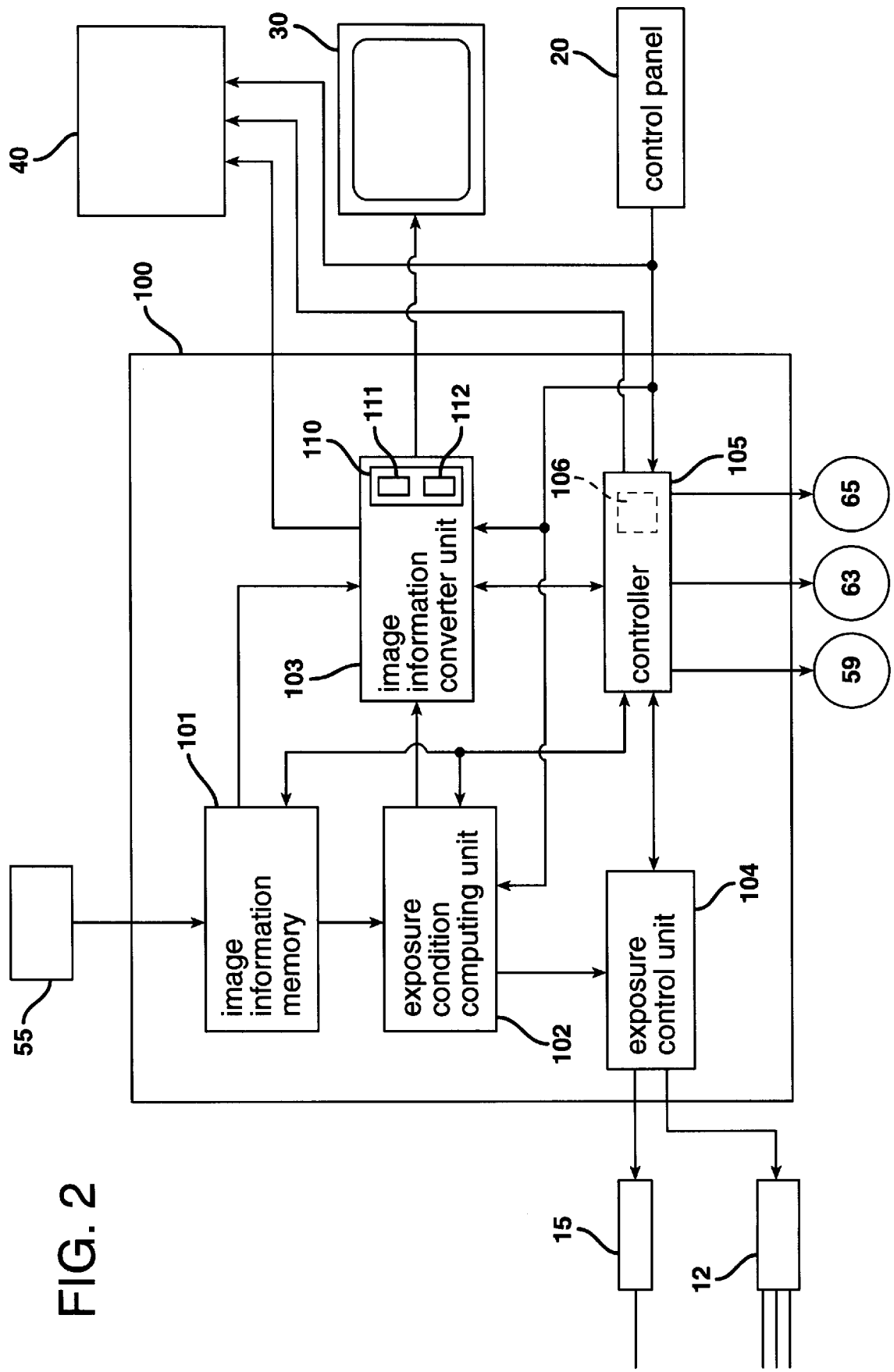
FIG. 2 is a construction view showing major portions of the apparatus of the embodiment.

As shown in FIG. 2, the controller 100 includes an image information memory 101 for storing image information read by the CCD image sensor 55, an exposure condition computing unit 102 for computing exposure conditions for exposure of the print paper 3 with this image information, an exposure control unit 104 for controlling operations of the light modulating filter 12 and shutter 15 of the exposure means 10 based on the exposure conditions computed by the exposure condition computing unit 102 to effect the exposure of the print paper 3, an image information converter unit 103 for displaying the image information read from the image information memory 101 on the monitor 30 based on the exposure conditions computed by the exposure condition computing unit 102 with respect to the image information and also for converting this image information into image information to be printed out by the video printer 40, and a control unit 105 for controlling the operations of the respective components such as the image information memory 101, exposure condition computing unit 102, image information converter unit 103 and the exposure controller 104. Further, this control unit 105 includes a memory 106 for storing index-printing additional information (described later) which is inputted in advance, and data and the kinds of these data to be inputted later.

The image information memory 101 has a memory capacity sufficient for storing the image information read by the CCD image sensor 55 and relating to a plurality of frames of the film 2, so that this memory 101 is capable of storing image information of all frames of a single roll of film 2 as will be detailed later.

With the above-described possibility of storing image information of a plurality of film frames, the image converter unit 103 reads the image information of plural frames from this image information memory 101 and effects a conversion operation on the same to allow the monitor 30 to display the image information of plural frames at one time.

When the image information memory 101 has stored one film 2 roll amount of image information therein, the exposure condition computing unit 102 effects, prior to determination of exposure conditions for the respective frames, a statistical averaging processing of densities of the respective R (red), G (green), B (blue) color components, thereby to determine original film characteristics inherent in each particular film 2 indicating how the respective colors of the film 2 will be developed depending on the amount of light incident from the photographic subject.

For obtaining exposure conditions for the respective frames of the film 2, from average color densities of each frame, i.e. average light amounts received by the frame from the photographic subject, color development characteristics corresponding to the frame are obtained based on the original film characteristics of the particular film 2.

The exposing condition computing unit 102 stores therein in advance an algorithm for computing exposure conditions needed for appropriate reproduction of the image information of the film 2 on the print paper 3 by compensating for the original film characteristics of the film 2. Then, in accordance with this algorithm, the exposure conditions are computed from the color development characteristics corresponding to each frame and obtained in the above-described manner.

The exposure conditions computed in the manner above may be corrected by an operator by using density correction keys provided to the control panel 20 for instructing average increase or decrease of exposure amounts of the respective Y (yellow), M (magenta) and C (cyan) color components or average increase or decrease of exposure amounts corresponding to density variation in the photography. Then, with this correction instruction, the exposure condition computing unit 102 effects a correction computation of the exposed conditions to provide new exposure conditions.

The image information converter unit 103 stores therein in advance an algorithm to be used for a conversion operation such as a negative-to-positive conversion operation on the image information read from the image information memory 101. And, various parameters constituting this algorithm may be modified in accordance with the exposure conditions computed by the exposure condition computing unit 102.

Accordingly, the image information inputted to the image converter unit 103 undergoes the conversion operation according to the algorithm, so that image information equivalent to the image information of the film 2 projected and exposed on the print paper 3 for development thereon may be displayed on the monitor 30 and may also be printed out by the vide printer 40.

For allowing the display of image information of plural frames on the monitor 30 and also printing-out of this image information by the video printer 40, the image converter unit 103 includes an image composer 110 for composing the image information of plural frames into one sheet amount of image information. And, this image composer unit 110 includes a first image composing unit 111 for composing the image information of plural frames into the one sheet amount of image information, and a second image composing unit 112 for composing also data for exposure condition display as the image information to be sent to the monitor 30 and composing additional display information (to be described later) sent from the controller 100 as the image information to be sent to the video printer 40. These first and second image composing units 111, 112 may be constructed integrally with each other or independently of each other.

The above-described converted or composed image information is transmitted in the form of video signals such as analog or digital RGB signals to the monitor 30 and the video printer 40.

Incidentally, when the exposure condition computing unit 102 computes new exposure conditions in response to a correction instruction from the control panel 20, the image information converter unit 103 effects the image information conversion operation based on these new exposure conditions and this converted image information is sent to the monitor 30 to be displayed thereon. With this, the image information displayed on the monitor 30 is corrected according to the correction instruction from the control panel 20.

On the other hand, when a non-correction instruction is inputted from the control panel 20, the exposure conditions originally computed by the exposure condition computing unit 102 are used as they are without any correction for an exposure operation.

Figure 3:
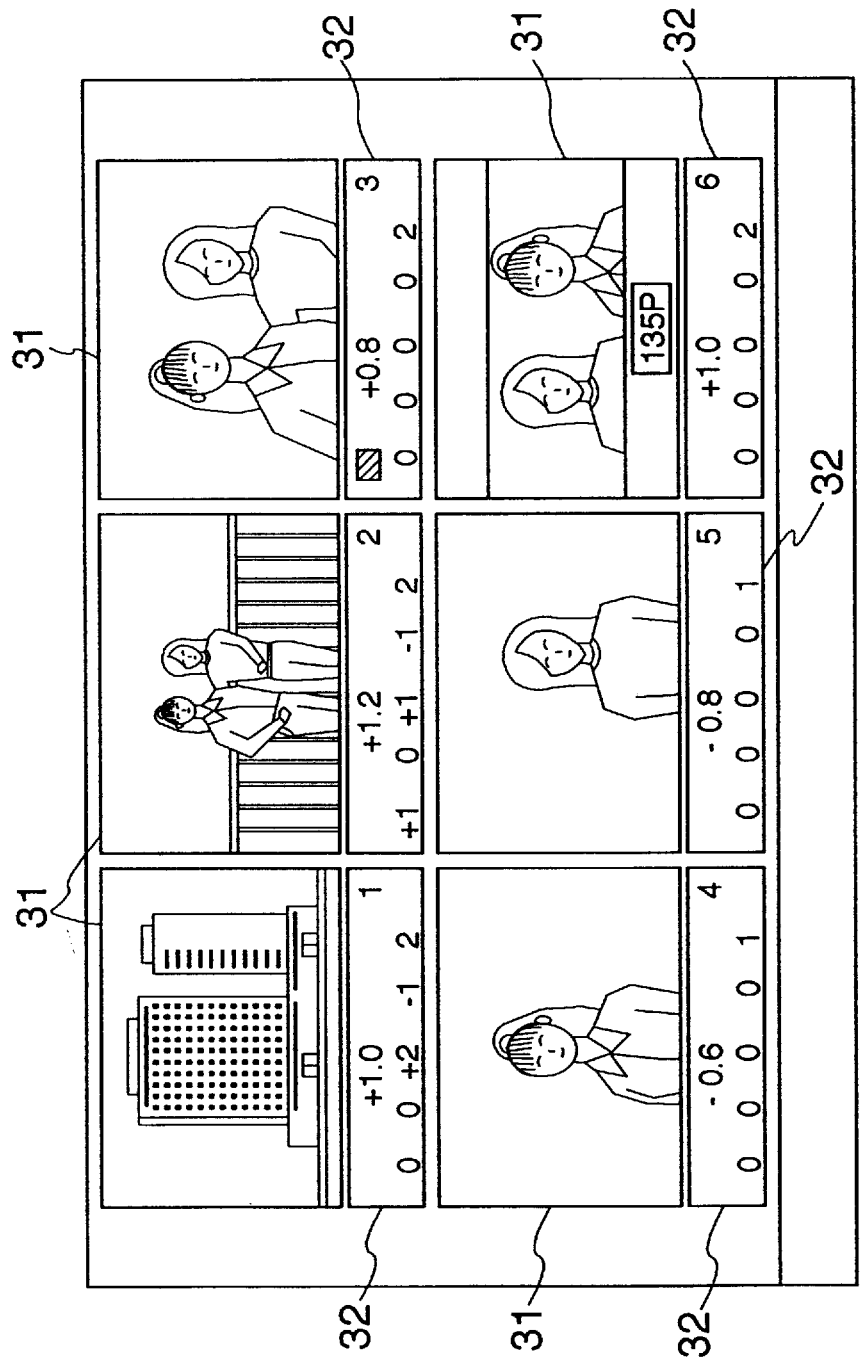
FIG. 3 is an exemplary view of a monitor display relating to the embodiment.
Figure 4:
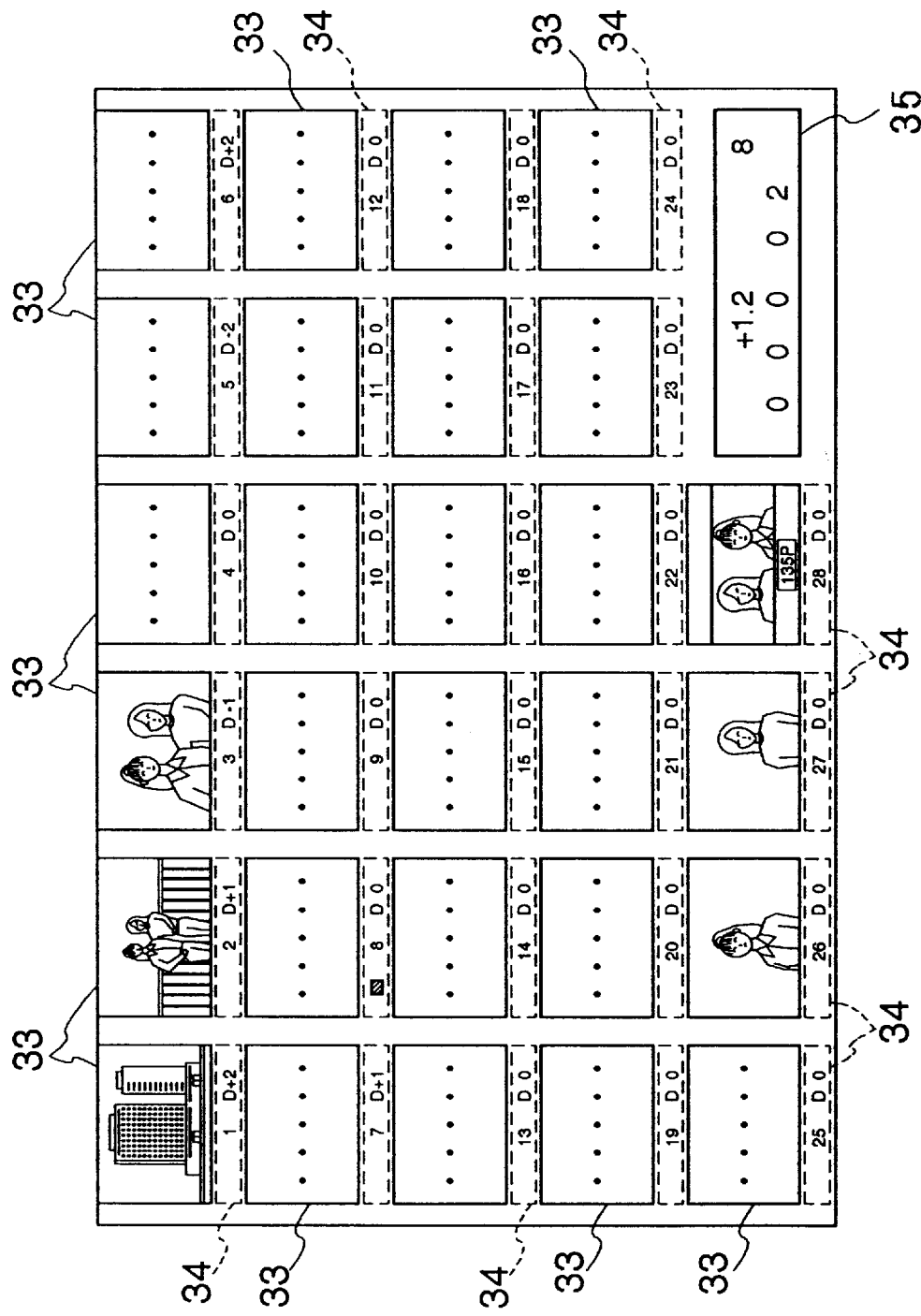
FIG. 4 is an exemplary view of a further monitor display relating to the embodiment.
Figure 5:
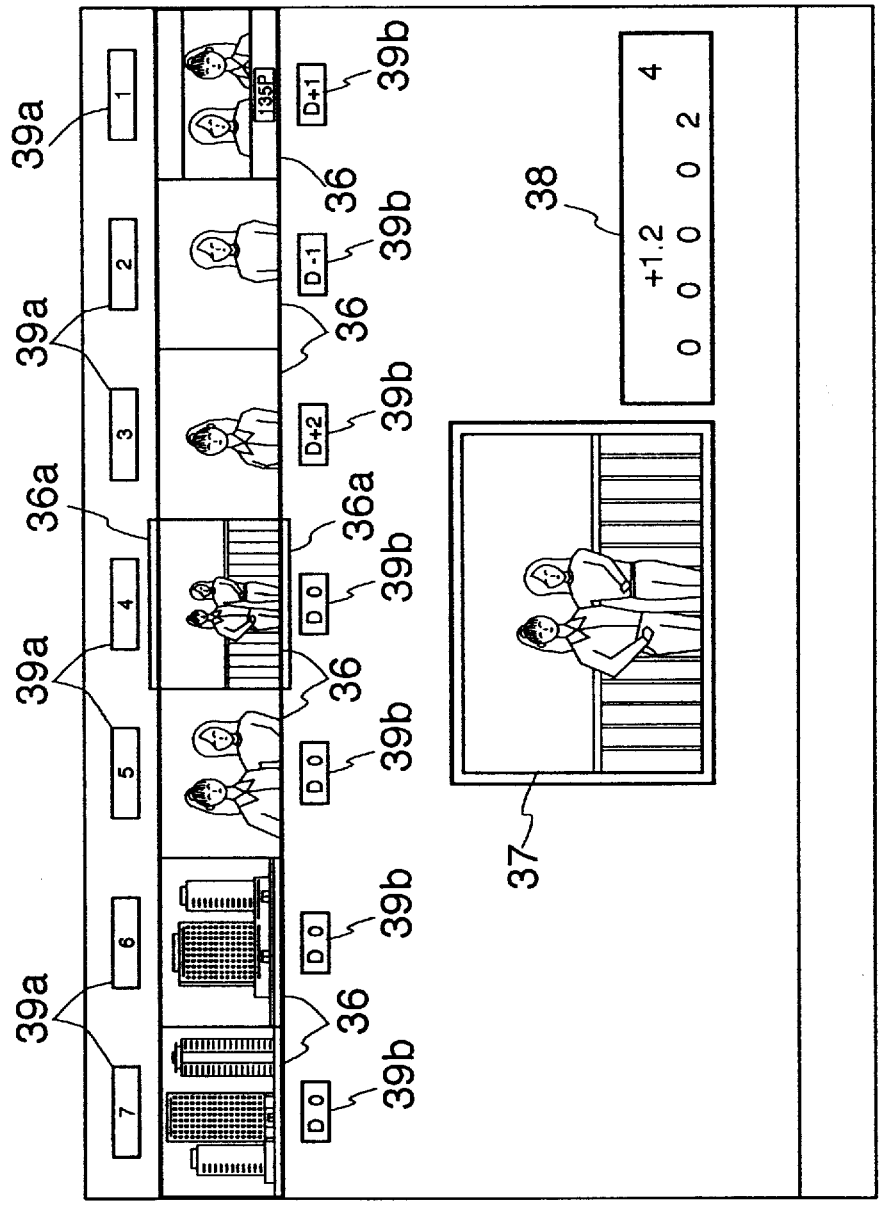
FIG. 5 is an exemplary view of a still further monitor display relating to the embodiment.

FIGS. 3 through 5 show three display modes of the image information to be displayed on the monitor 30. Namely, FIG. 3 shows a 6-frame display mode for displaying six frames of image information, FIG. 4 shows a 28-frame display mode for displaying twenty-eight frames of image information and FIG. 5 shows a cinema view display mode in which seven frames of image information is displayed at an upper end portion of the display screen and one selected from these seven frames of image information is displayed with enlargement at the center of the screen. One of these three modes may be selected by an instruction via the control panel 20.

The 6-frame display mode is for displaying the image information of the respective frames of the film 2 as divided in the groups of six successive frames each, with one group being displayed another. For this purpose, there are provided image information display areas 31 having display regions corresponding together in size to six negative frames, and data display areas 32 for the respective image information display areas 31.

Figure 6:
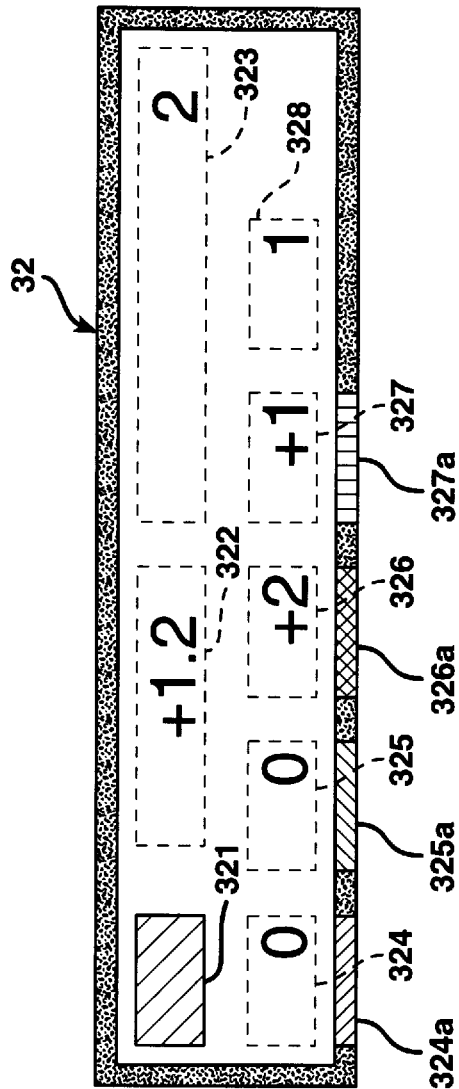
FIG. 6 is an enlarged view of the monitor display relating to the embodiment.

As particularly shown in FIG. 6, each data display area 32 includes a cursor display section 321 for indicating that this corresponding particular frame is being designated as the object of input of a correction instruction from the control panel 20, a density value display section 322 for displaying the average density value obtained from the light measurement amounts of the CCD image sensor 55, Y-key correction value display section 324, M-key correction value display section 325 and C-key correction value display section 326 for displaying correction instructions from the control panel 20 for the respective Y, M and C color components, a density key correction value display section 327 for displaying correction instructions from the control panel 20 concerning average increase/decrease of the exposure amounts corresponding to the density variation of the photograph, and a print number display section 328 for displaying the number of prints of the frame inputted from the control panel 20.

Under the Y-key correction value display section 324, M-key correction value display section 325, C-key correction value display section 326 and density key correction value display section 327, respectively, there are displayed Y,M,C and white-colored guide marks 324a, 325a, 326a, 327a.

The 28-frame display mode is for displaying the image information of the respective frames of the film 2 in the groups of twenty eight frames each, with one group being displayed an other. Yet, in the case of the most widely-used 135 size film, the film contains the maximum of 36 (thirty six) frames. Therefore, this display mode may display at a time most of the image information of one entire film roll 2.

In this 28-frame display mode, as shown in FIG. 4, under each image display area 33 including a negative-sized display region for each frame, there is provided an auxiliary data display area 34 for displaying a cursor a frame number, and correction instructions concerning the average increase/decrease of the exposure amount corresponding to the density variation of the photograph. Further, at a right lower region on the display screen of the monitor 30, there is provided a data display area 35 for displaying data of a particular frame which is being subjected to a correction instruction from the control panel 20.

The contents of the data to be displayed at this data display area 35 are the same as those displayed at each data display area 32 of the 6-frame display mode described above, except that this data display area 35 does not include the cursor display section 321 of the 6-frame display mode.

Referring now to the cinema view mode, as shown in FIG. 5, the display screen includes image information display areas 36 disposed at an upper end region of the screen and having display space corresponding to seven frames of negatives, an enlarged display area 37 disposed at a slightly lower center area of the display screen for displaying the image information of the one image display area 36 located at the center of the row of the seven-frames of the image information display areas 36, and a data display area 38 disposed on the right side of the enlarged display area 37.

The data display area 38 displays data concerning the image information displayed on the enlarged display area 37, and the contents of the data are the same as those of the data display area 31 of the 6-frame display mode with exclusion of its cursor display section 321. Then, the frame displayed on this data display area 38 is subjected to correction instructions from the control panel 20.

Further, above each image information display area 36, a frame number display area 39a is provided for displaying the number of the corresponding frame, and under the image information display area 36, a density key correction value display area 39b for displaying the correction instruction from the control panel 20 concerning the average increase/decrease of the exposure amount corresponding to the density variation of the photograph. Moreover, above and under the central image information display area 36, whose image information is to be displayed on the enlarged display area 37, there are shown bar-like cursors 36a.

In either of the above-described 6-frame display mode and 28-frame display mode, an operator moves the cursor display to designate a target frame on which a correction instruction and a number of prints are to be inputted. In the cinema view mode, with an operation of the control panel 20, the image information displayed on the image information display areas 36 is shifted forwardly to the right or reversely to the left, thereby to designate a target frame on which a correction instruction and a number of prints are to be inputted. Incidentally, when a number of prints is to be inputted, if printing of a certain frame is unnecessary for e.g. its out-of-focus exposure, an operator may depress a 'SKIP' key provided on the control panel 20, so that the monitor 30 displays the sign: "SKIP" in its printing number display area 328.

Like the image information displayed at the lower right end region in the sample display of the 6-frame display mode shown in FIG. 6, the single roll of film 2 may contain image information of a so-called panoramic photograph having an aspect ratio (i.e. longitudinal-to-transverse ratio) different from that of the standard size, i.e. the so-called full-size frame. Such image information of non-standard aspect ratio too may be processed in the same manner as the standard type image information.

When the controller 100 detects inclusion of such panoramic photograph in the film 2 based on aspect ratios of image information stored at the image information memory 101, the monitor 30 displays, under the displayed image information of the panoramic photograph, a letter 'P' indicating a panoramic photograph, together with the sign '135' indicating the film size.

One example of such image information of non-standard aspect ratio is that of the so-called High-Vision photograph. This image information too, like that of the above-described panoramic photograph, may be detected and the monitor 30 displays a sign, e.g. 'H'.

The detection of the panoramic photograph or the like is automatically effected by the controller 100 as described above. In this respect, in order to be able to cope with an error in the automatic detection, the control panel 20 allows manual input of instruction for specifically indicating a panoramic photograph or conversely a full-size photograph.

When the image information comprises that of a panoramic photograph or the like, the exposure condition computing unit 102 computes the exposure conditions based according to the aspect ration of the image information, based image information of non-standard aspect ratio.

The image information of non-standard aspect ratio like that of a panoramic photograph or the like is processed in the same manner not only in the above-described 6-frame display mode, but also in the 28-frame display mode and the cinema display view mode as shown in FIGS. 4 and 5 respectively.

In all of the three display modes, as shown in FIGS. 3 through 5, image information is displayed with the normal vertical orientation. Yet, depending on the type of a camera employed for photography, an image may be exposed with the reverse vertical orientation, or the film 2 may be erroneously set to the photographic printing apparatus with wrong side out.

In order to cope with such case, with an input of instruction via the control panel 20, or by reading, by means of the CCD image sensor 55, a DX code provided at the upper and lower regions of the film 2 excluding the frame area, the image information converter unit 103 may turn or rotate the image information of the entire roll of film 2 by 180 degrees to orient it upside down for its display on the monitor 30.

Further, by designating a particular frame via the control panel 20, its image information may be turned by 90 or 180 degrees to be displayed under this condition on the monitor 30.

The number of frames printed within a single sheet of index print produced by the video printer 40, i.e. the number of frames to be composed into a single piece of image information by the image composer 110 of the image information converter unit 103, may be freely set via the control panel 20. Further, in the image information processing for the printing by the video printer 40 too, the operations manually made by the operator via the control panel 20 and the operations executed by the controller 100 are effectively utilized. For instance, the detection of the size of the film 2, such as the full-size, panoramic size or the like, the 90 or 180 degree rotation of the image information are processed also for the signals to be transmitted to the video printer 40. Further, when the film 2 is charged to the photographic printing apparatus 1 with placing its last frame at the beginning and the reader device 50 starts its image information reading operation from this last frame, or when the reader device 50 reads a plurality of so-called piece negatives each including some of the frames of the film 2 cut from the remaining frames, a printing operation is possible with re-arranging the frames from the lower frame number according to e.g. the DX code.

Also, when the film 2 has no DX code, or when the reader device 50 is unable to read the frame number of a certain frame, the control panel 20 allows manual input of the frame number of the particular frame.

Figure 7:
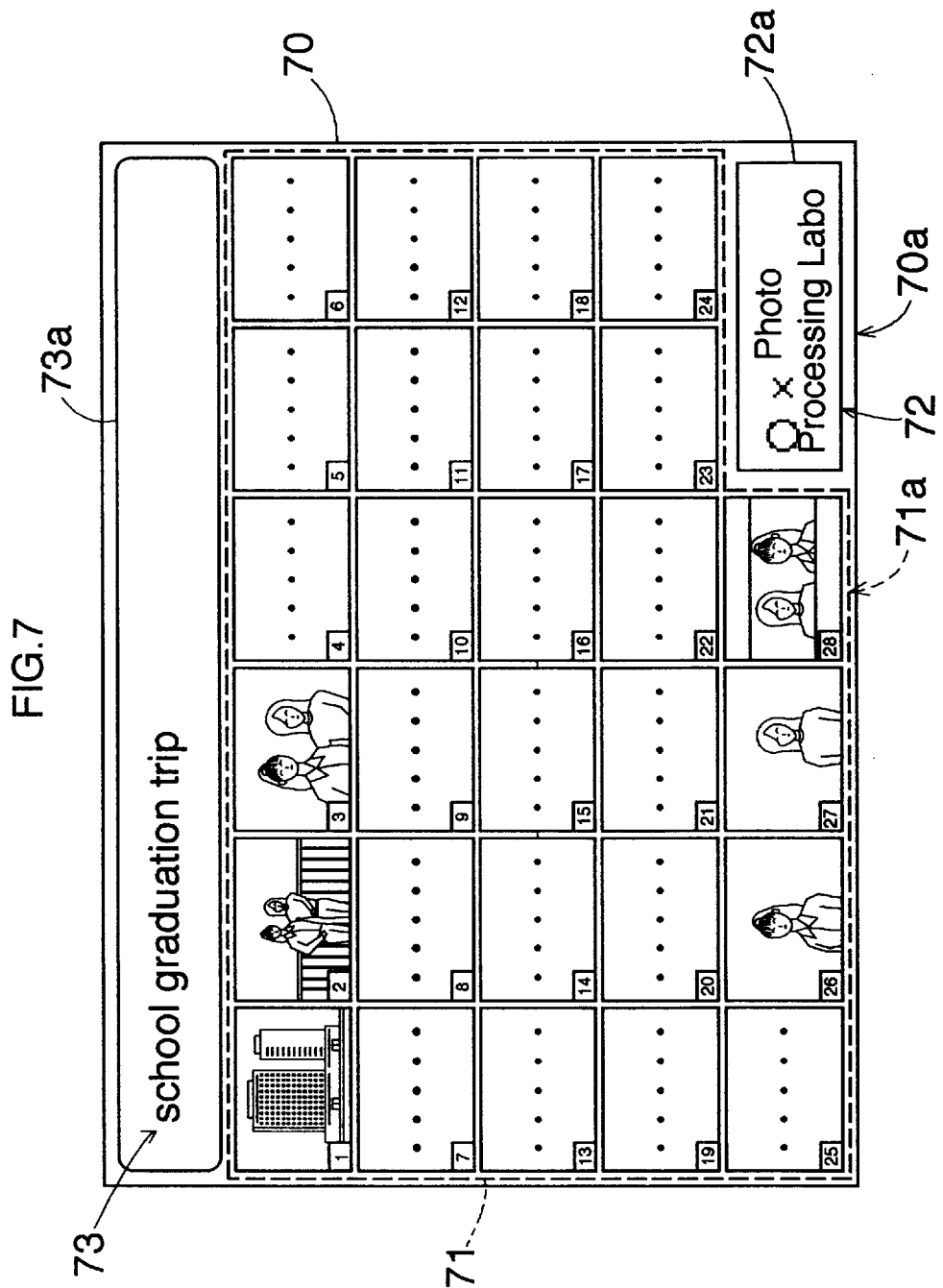
FIG. 7 shows a sample of an index print relating to the embodiment.
Figure 8:
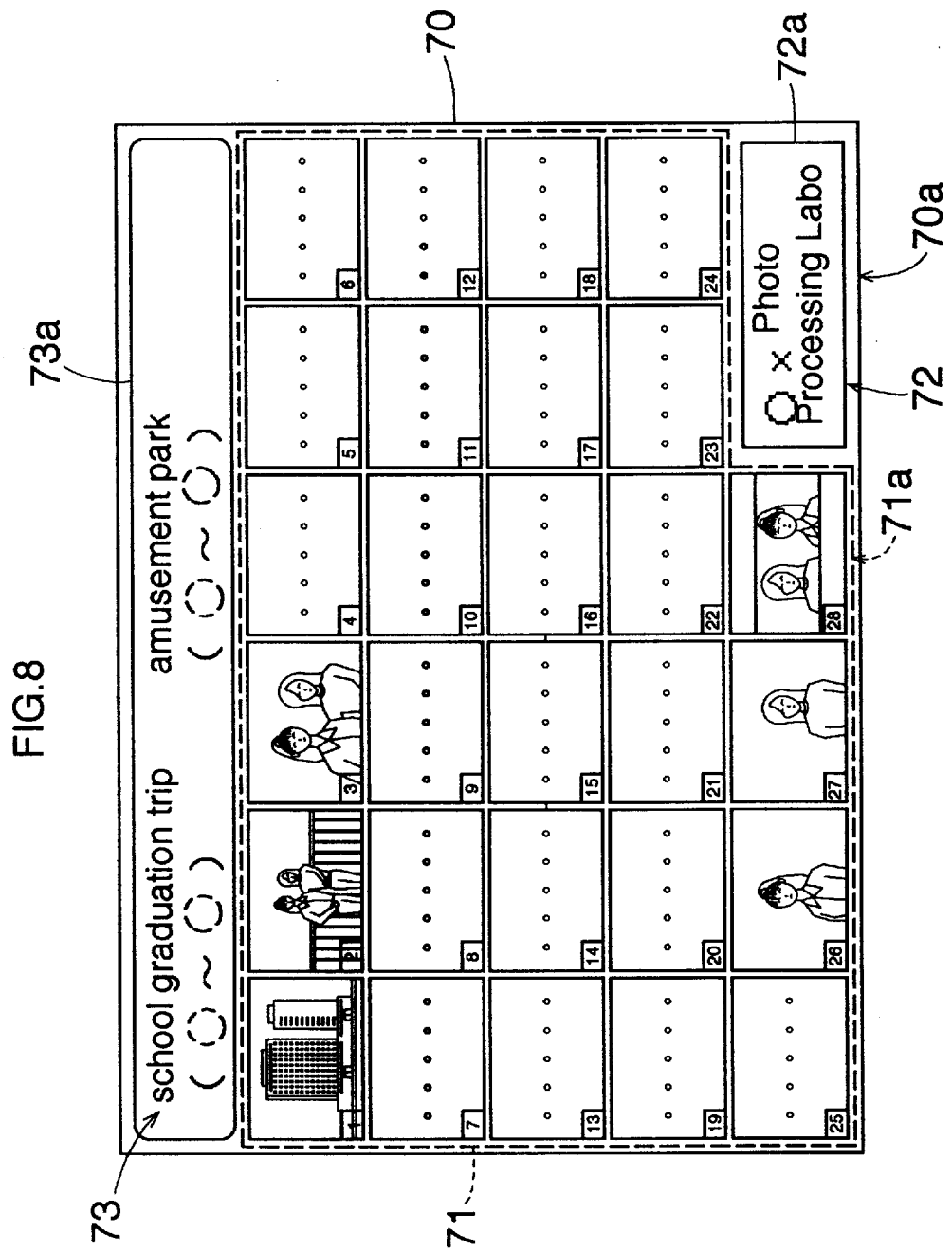
FIG. 8 shows another sample of the index print relating to the embodiment.

Accordingly, the data displayed on the data display area 32 and the auxiliary data display area 34 too may be printed on the index print sheet 70. Alternatively, with setting via the control panel 20, the frame number alone may be printed in correspondence with the image information, without printing such data. For instance, if setting is done for setting twenty eight frames as the number of frames to be printed on the single index print 70 and also for not displaying other data than the frame numbers, the resulting index print will be as shown in FIGS. 7 and 8. Incidentally, if a frame number cannot be read from the film 2, this frame number may be instructed via the control panel 20 to be printed.

In the samples shown in FIGS. 7 and 8, the index print sheet 70 includes an image information display area 71 in which a plurality of frames of image information are printed in close proximity with each other, and two additional information display areas 72, 73 defined respectively between an edge 1*a* of the image information display area 71 and an edge 70*a* of the index print sheet 70. And, the additional information display area 72 located at the right lower side of the image information display area 71 is encircled by a line frame 72*a*; and the other additional information display area 73 located at the upper side is encircled by a line frame 73*a*. These line frames 72*a*, 73*a* are printed together with the image information on the index print sheet 70.

In the samples shown in FIGS. 7 and 8, the additional information display areas 72, 73 are provided at the two locations at the upper side and right lower side of the image information display area 71. Instead, as shown in further samples of FIGS. 9 through 12, the index print sheet may include two upper additional information display areas 73. The disposing locations and the number of these additional information display areas will vary depending on the number of frames of image information to be printed on the index print sheet and also on the amount of such additional information.

Figure 9:
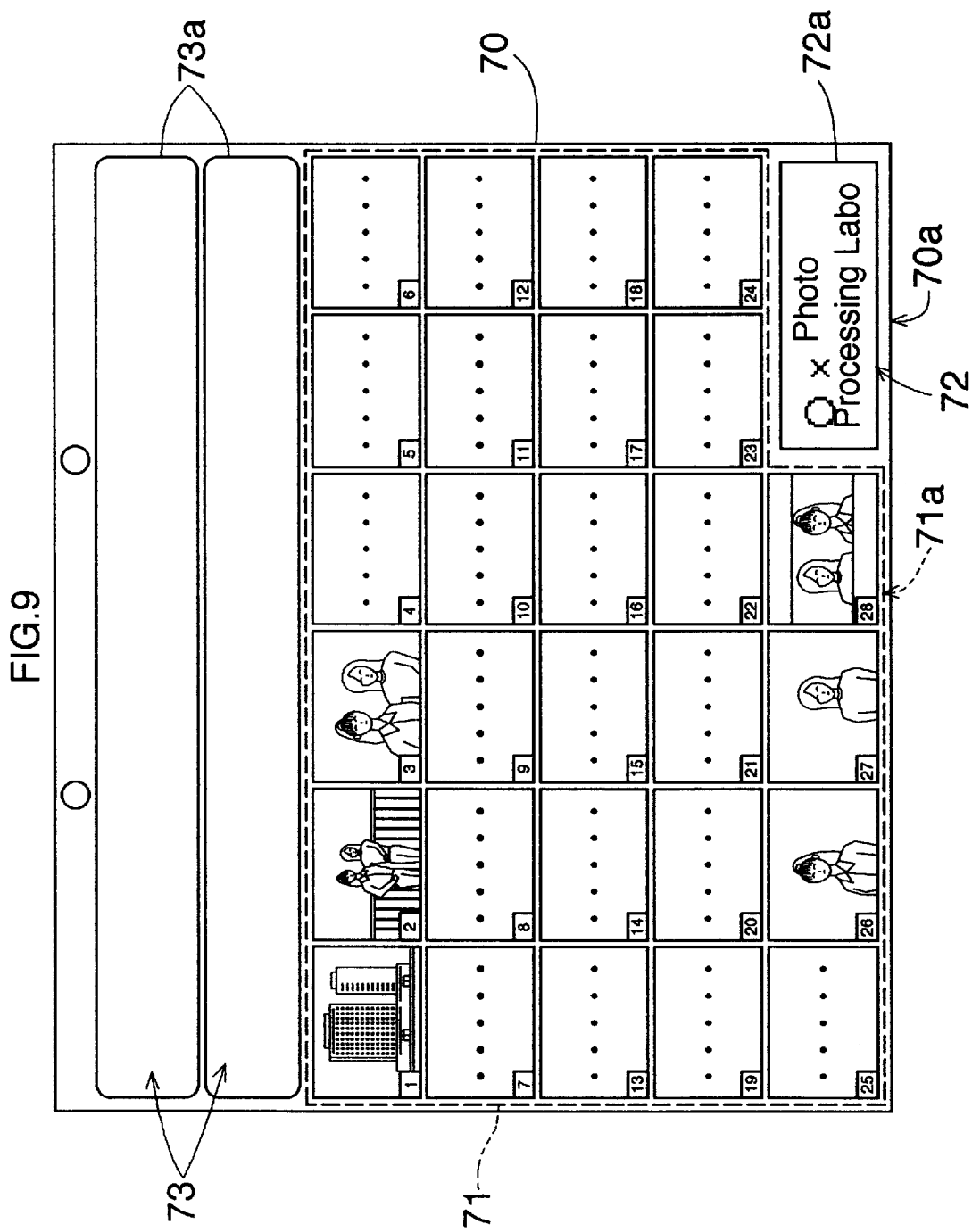
FIG. 9 shows still another sample of the index print relating to the embodiment.

In the sample case of FIG. 9, the additional information display area 73 located over the image information display area 71 and encircled by the frame 73*a* is comprised of two upper and lower stages. One (upper) stage may be used as an area for printing information such as a message from a manufacturer of the index print to a customer; and the other (lower) stage may be used as an area reserved to be freely written in by the customer.

Figure 10:
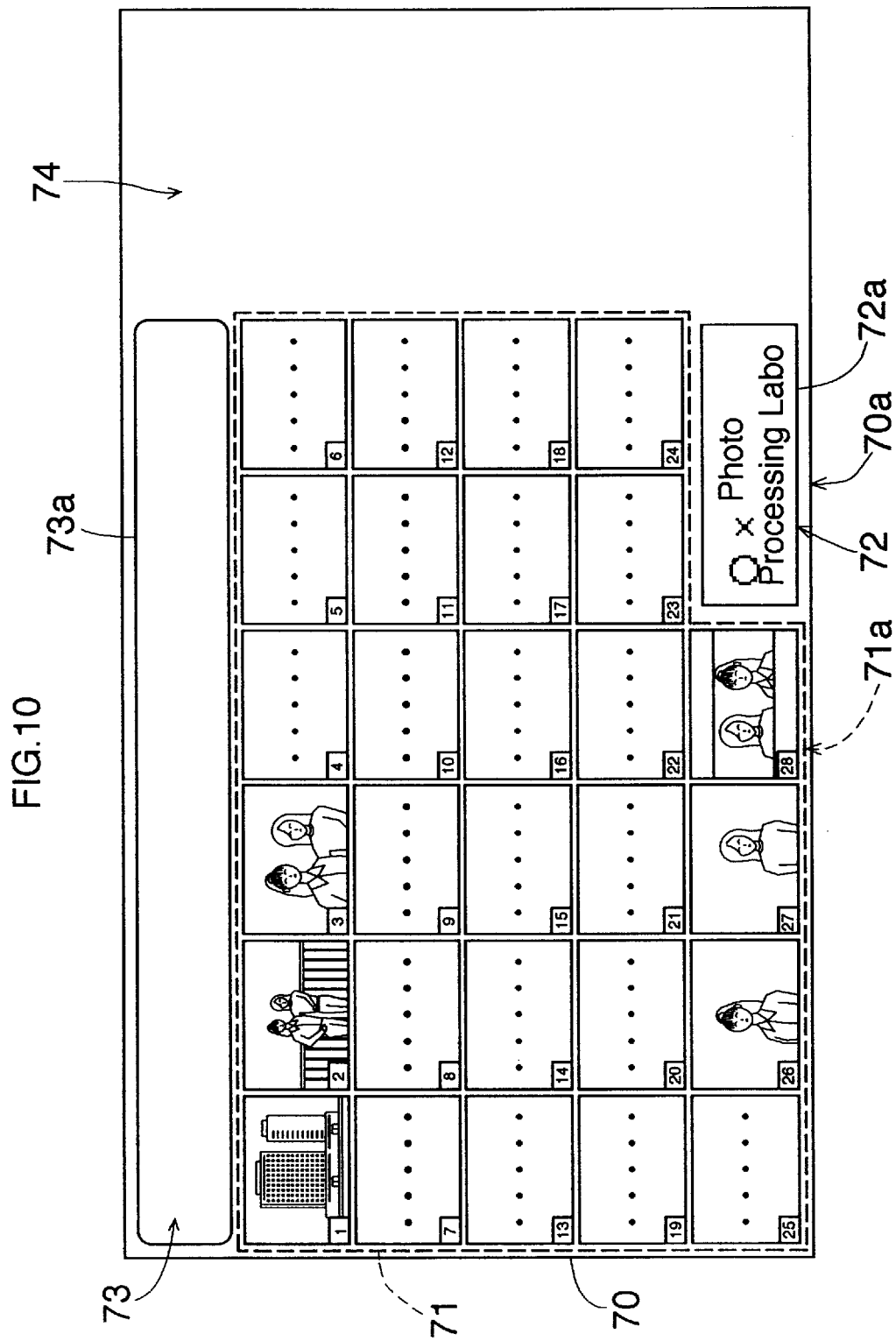
FIG. 10 shows still another sample of the index print relating to the embodiment.

In the sample case of FIG. 10, still another non-encircled additional information display area 74 is provided on the right of the image information display area 71.

Figure 11:
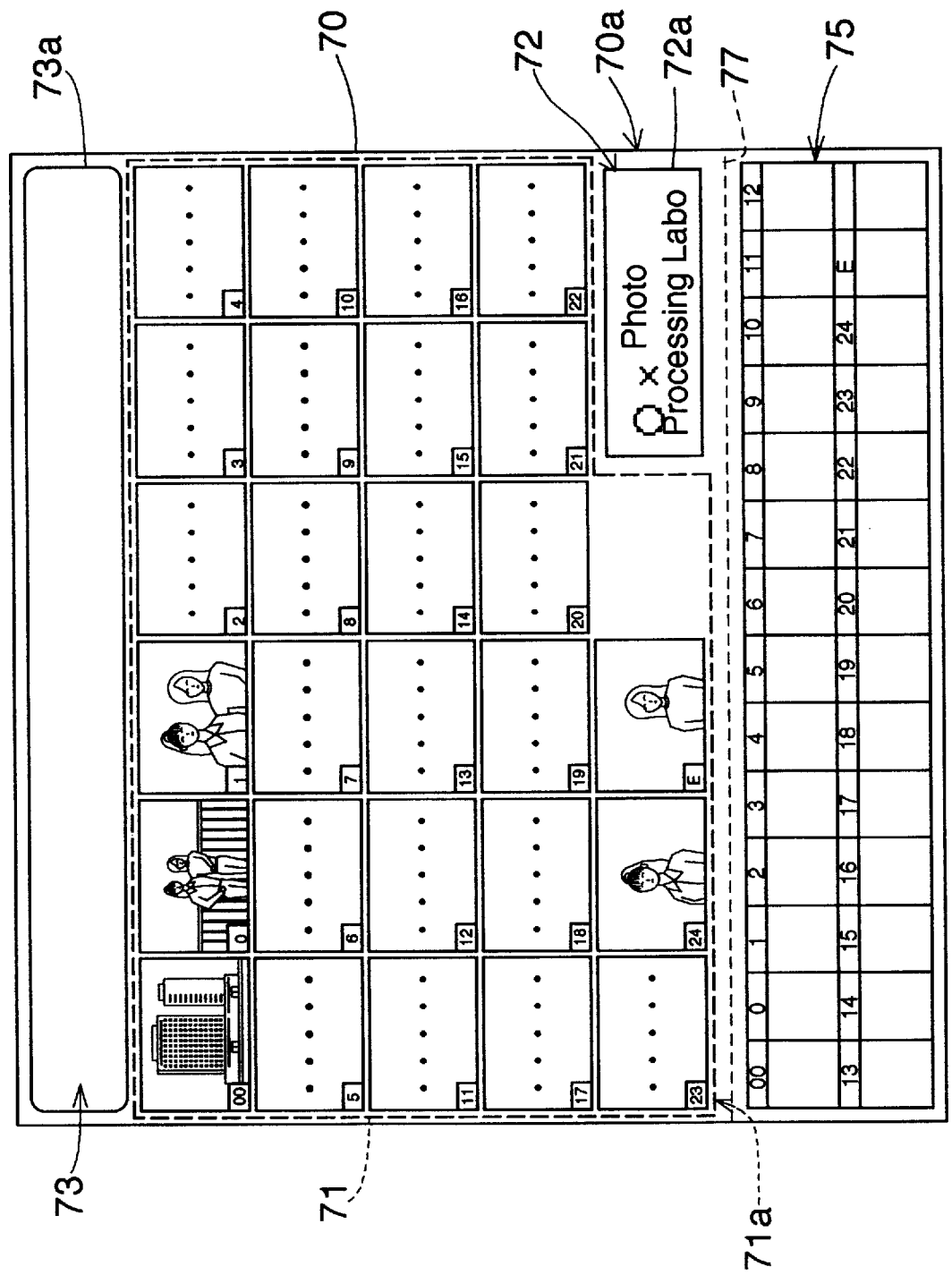
FIG. 11 shows still another sample of the index print relating to the embodiment.
Figure 12:
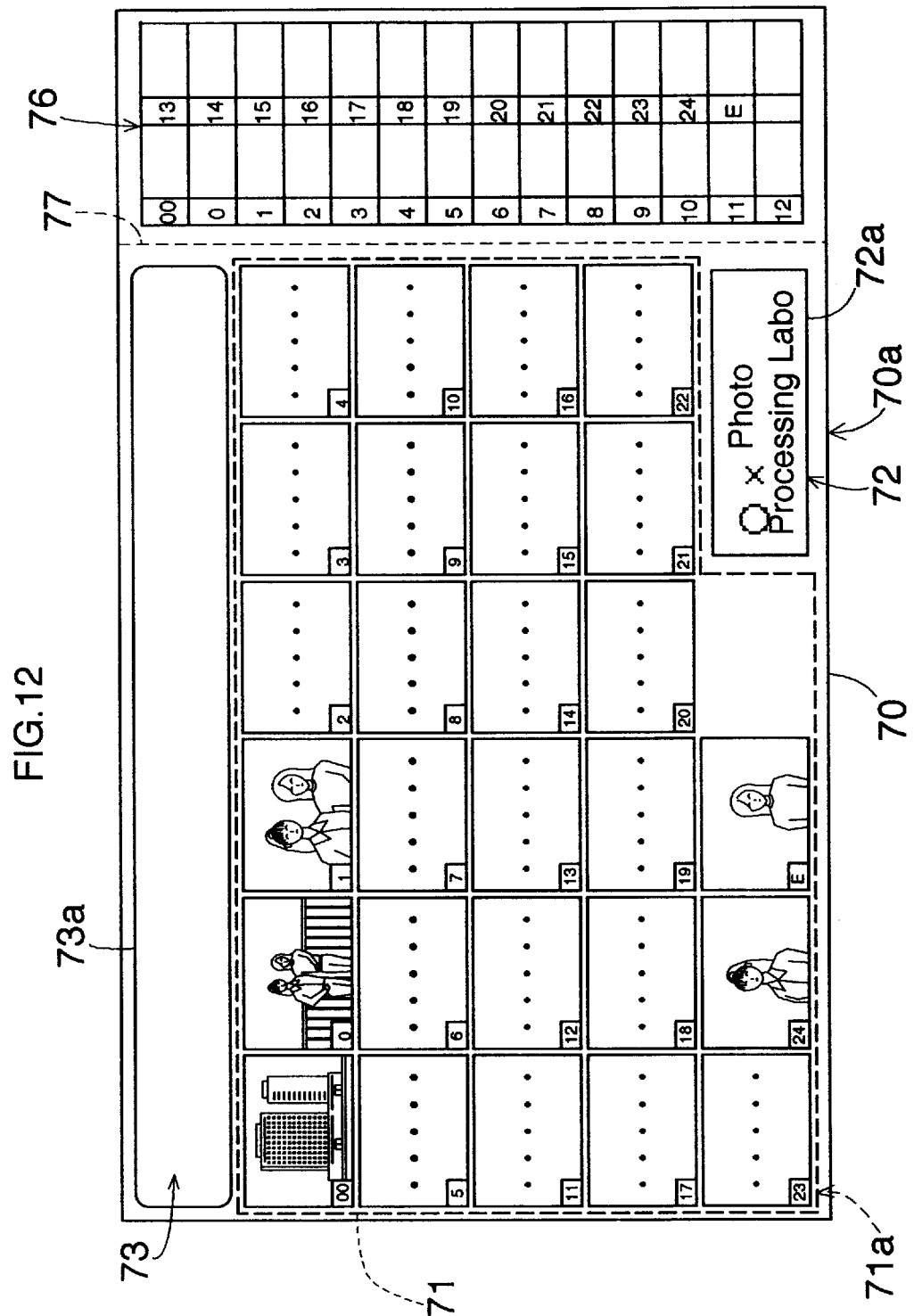
FIG. 12 shows still another sample of the index print relating to the embodiment.

In the further samples shown in FIGS. 11 and 12, as further additional information display areas, there is provided a 'copy-print number writing area' 75, 76 in which the customer will write the number of copy prints for ordering the copy prints. In the sample of FIG. 11, this area is provided on the lower side of the image information display area 71, and the area is provided on the right of the image information display area 71 in the case of the sample shown in FIG. 12. With these constructions, if the film 2 is a negative film, the customer may write the number of desired copy prints while viewing the positive images of the index print, not the negative images of the film 2. As a result, an erroneous ordering of copy prints of wrong frames may be effectively avoided.

Incidentally, in the cases of the sample constructions of FIGS. 11 and 12, a perforation 77 is provided for allowing easy detachment of the copyprint number writing areas alone from the rest of the index print sheet 70. Then, the customer may readily detach the copy-print number writing area for ordering a copy print while he/she may keep the rest of the index print sheet including the image information display area 71.

The additional information to be displayed at these additional information display areas 72 through 76 may comprise any character information inputted from the control panel 20, information freely selected via the control panel 20 from the plurality of kinds of additional information stored in advance at the memory 106 of the controller 100, and any other information to be displayed independently of instructions from the control panel 20.

The additional information stored in advance at the memory 106 may comprise information to be communicated from the manufacture of the index print to the customer, such as the name, address, telephone number or logo of the manufacturer, manufacture date of the index print, ID number or mark of the index print, manufacturer's remark to the customer, or additional service information for the customer to be printed upon request from the customer, such as messages or letters: "trip to . . . ", "honeymoon trip", "happy wedding", "happy birthday", "school graduation trip", "Congratulations on your wedding.", "We are all fine." "first visit to the shrine in the year 1995", "sea bathing", "camping", "amusement park", "primary school athletic meeting", and so on, or any other symbolic marks such as "~". Of these, with printing of the name or logo of the manufacturer for instance, the manufacturer may provide its strong impression to the customer.

In the print sample shown in FIG. 7, the letters; "school graduation trip" and "name of the manufacturer", are selected as the additional information to be printed, with one additional information display area 72 or 73 displaying one kind of additional information.

In the print sample shown in FIG. 8, the letters: "school graduation trip", "amusement park", and "name of the manufacturer" and the symbolic mark "~" are selected as the additional information to be printed, with each additional information display area 72, 73 displaying one kind of additional information. Incidentally, the symbolic mark "~" denotes or provides a space into which the customer may freely write the frame numbers of the image information corresponding to the additional information such as the "school graduation trip".

The control panel 20 allows designation on which of these selected kinds of additional information are to be printed in which of the additional information display areas 72 through 76 and also on the ordering arrangement of these kinds of additional information. This designation may be changed for each sheet of the index print. But, until some change is made, index print sheets will be continuously produced in the same ordering arrangement one after another.

Alternatively, even when no additional information is inputted, such marks as "Notes" may be printed together with the encircling frame to indicate that the encircled space may be used for free writing by the customer.

Further alternatively, with setting from the control panel 20, the additional information display area may be left as a complete blank space without printing of the encircling frame.

The desired character information to be inputted via the control panel 20 includes, in addition to the characters or letters per se, any marks or symbols which may be inputted via this control panel 20 in the same manner.

As described hereinbefore, the index print not always display the entire image information of the film 2. When image information of a certain frame is excluded from the printing with depression of the "SKIP" key of the control panel 20, this image information will be excluded from the plurality of kinds of image information to be composed by the image information converter unit 103 to be sent to the vide printer 40, so that the resulting index print will not contain this image information. Further, if certain image information is detected to be abnormally high or low in the density by the image information converter unit 103, then, with setting via the control panel 20, such abnormal frame image information may be excluded from the image information to be subjected to the composing process.

Figure 13A:
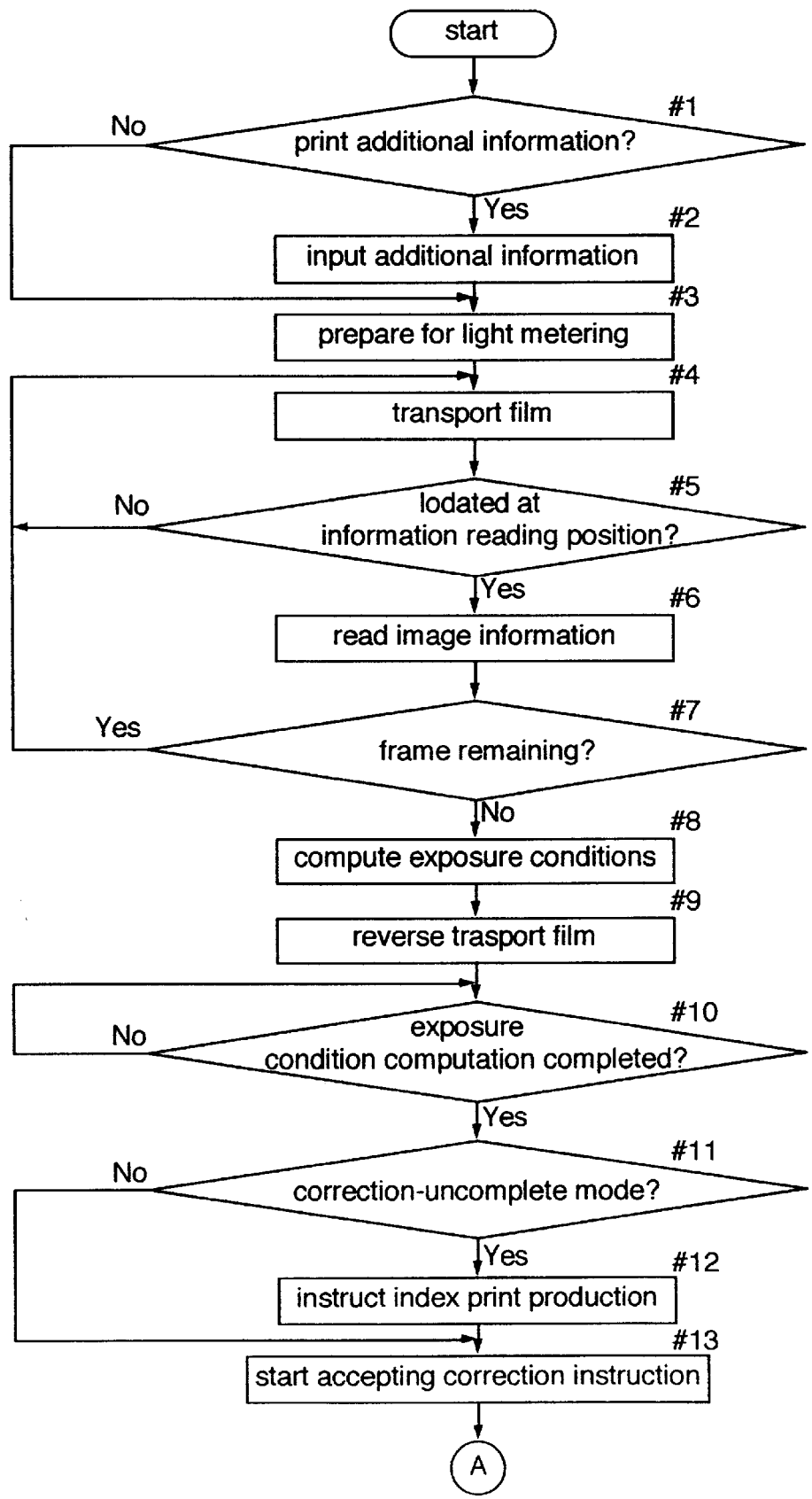
FIGS. 13A and 13B are a flowchart relating to the embodiment.
Figure 13B:
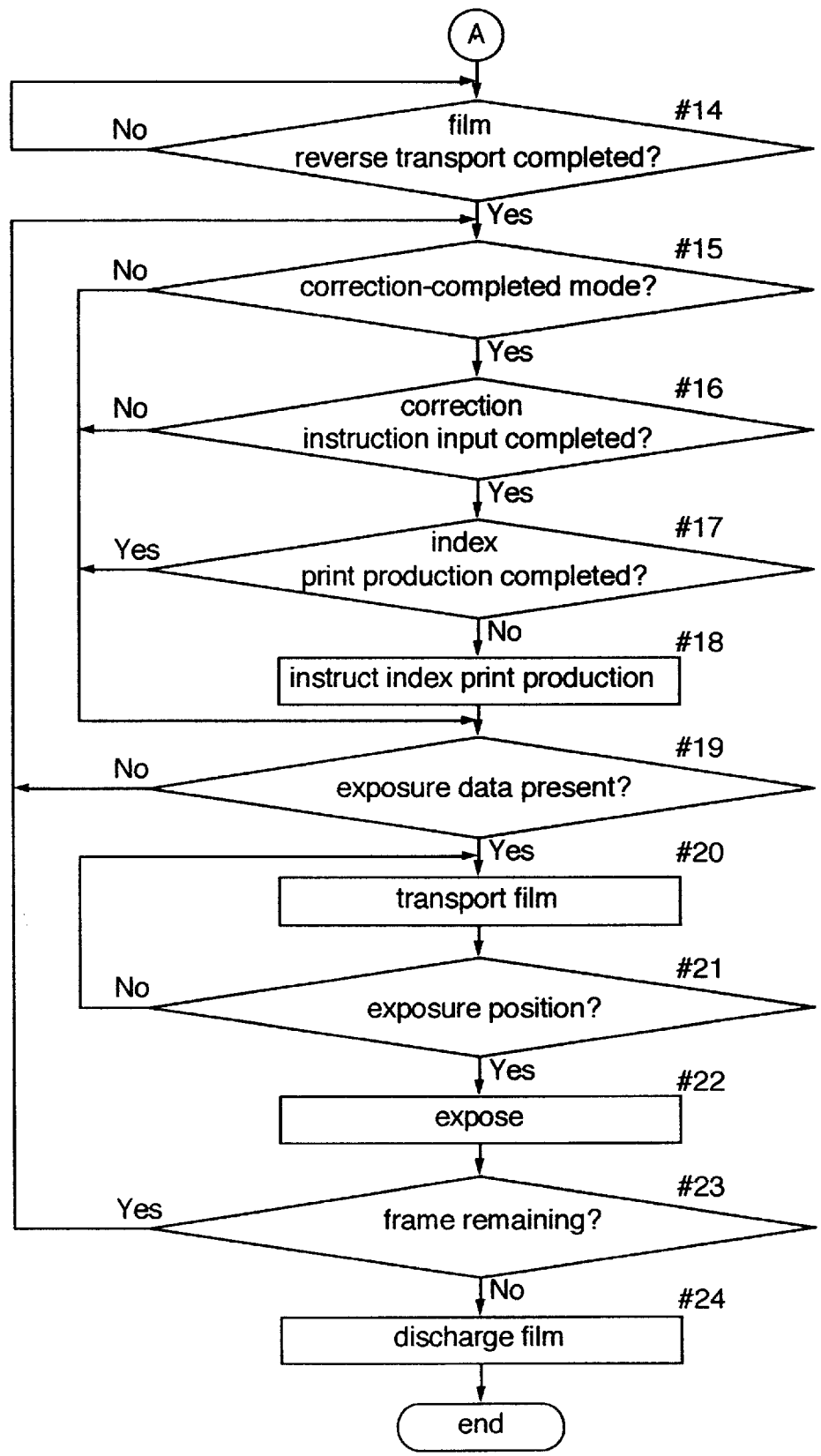
Figure 15A:
FIGS. 15A to 15E show further parallel timing charts relating to the embodiment.
Figure 15B:
Figure 15C:
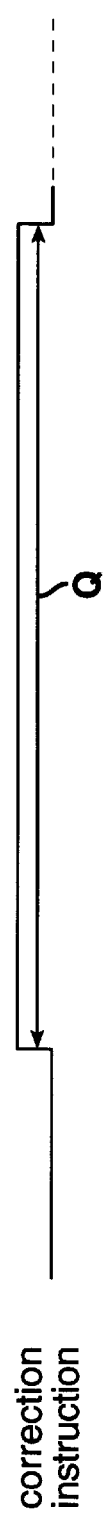
Figure 15D:
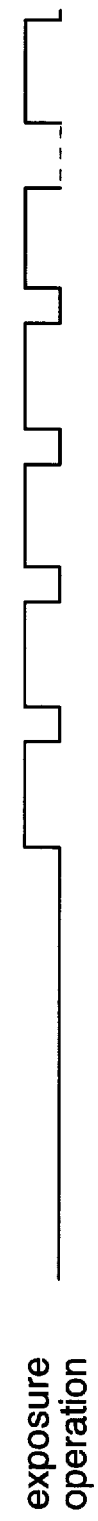
Figure 15E:
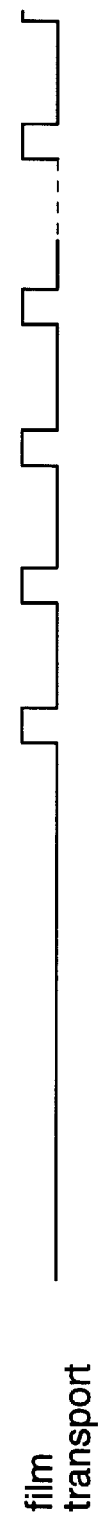

Next, the operations of the respective apparatus components by the control unit 105 of the controller 100 will be described with reference to a flowchart of FIGS. 13A and 13B and timing charts of FIGS. 14A to 14E and 15A to 15E.

First, when an instruction is given via the control panel 20 for printing, in the index print, additional information in addition to the image information of the film 2 (step #1), the controller receives an input of the selection or contents of the additional information to be printed (step #2).

Then, the process prepares for a light measuring operation by causing the reflecting mirror 51 of the exposure means 10 to be moved into the exposure light path so as to guide the image information of the film 2 to the CCD image sensor 55 (step #3). Upon completion of this preparation, the motor 63 is activated to transport the film 2 in the direction of arrow N in FIG. 1 until the frame of the film 2 reaches an image information reading position located in the exposure light path (step #4, step #5).

The transportation of the film 2 is suspended when the film has reached the image information reading position. Then, the image information of the film 2 and such film data e.g. the DX code of the frame number recorded in advance at an area of the film outside the frame area are read (step #6) and these are stored at the image information memory 101. This reading operation of the image information is continued until exhaustion of the frames of the entire film roll 1 is detected (step #7).

Upon completion of the reading operation of the image information of the entire film roll 2, the controller instructs the exposure condition computing unit 102 to start computation of exposure conditions (step #8), whereby the printing lens 14 is moved into the exposure light path in place of the reflecting mirror 51 and also the motor 63 is driven in the reverse direction to reversely transport this film whose image information reading has been completed in the direction opposite to the direction of arrow N in FIG. 1 (step #9).

The process stands by under the above condition until the exposure condition computing unit 102 completes the exposure condition computing operation (step #10). Then, when the controller receives from the exposure condition computing unit 102 a signal indicating completion of the exposure condition computing operation, and if then the index print mode is currently set to the correction-uncompleted mode (step #11), the controller causes the image information converter unit 103 to effect a composing operation of the image information for an index print, at this time before the operator inputs a correction instruction, and the video printer 40 is instructed to print this composed image information (step #12). In the course of the above, if additional information is selected or inputted at step #2, this additional information too will be sent to the image information converter unit 103 so that the additional information may be printed together with the image information.

Thereafter, a command is given via the control panel 20 to the exposure condition computing unit 102 and the image information converter unit 103 for causing these units to be ready for accepting correction instruction from the control panel 20 (step #13).

In this condition, if the display mode instructed from the control panel 20 is either the 6-frame display mode or the 28-frame display mode, the image information converter unit 103 causes the monitor 30 to display image information of 6 or 28 frames in the above-described manner. So that, while observing this display on the monitor 30, the operator may enter a correction instruction during a period P shown in the timing charts of FIGS. 14A to 14E. With reception of this correction instruction, the exposure condition computing unit 102 performs a correction computation of the exposure conditions, so that image information re-converted by the image information converter unit 103 according to the computation is displayed on the monitor 30.

When the operator completes input of correction instructions on all the six or twenty-eight frame amount of image information displayed on the monitor 30, the exposure condition computing unit 102 transmits the eventually corrected exposure conditions to the exposure control unit 104 and the image information converter unit 103 effects a conversion of this 6 or 28 frame amount of image information to be displayed on the monitor 30. Then, by observing this monitor display, the operator continues input of further correction instruction.

In case the display mode instructed at step #13 is the cinema view mode, first, image information of the four leading frames is displayed at the left-end image information display area 36 through the central image information display area 36. In this, as described hereinbefore, the image information of the central image information display area 36 is displayed also with enlargement at the enlarged display area 37.

When the exposure condition computing unit 102 receives from the control panel 20 an input of correction instruction on the image information displayed at the enlarged display area 37, the computing unit 102 performs a correction computation of the exposure conditions, so that image information re-converted by the image information converter unit 103 according to the computation is displayed on the monitor 30.

With completion of correction instruction on one frame amount of image information, the image information converter unit 103 forwardly shifts to the right in succession the image information displayed at the image information display areas 36 of the monitor 30, so that the left-end image information display area 36 now displays new image information of the next frame. With this, the image information displayed at the enlarged display area 37, i.e. the image information to be subjected to a correction instruction from the control panel 20 too is renewed.

Then, as the operator effects correction instructions on exposure conditions one after another and the image information comes to overflow from the right-end image display area 36, then, the exposure condition computing unit 102 sends the final exposure conditions of the successive frames to the exposure control unit 104 according to the order of their overflowing. Therefore, in this cinema view mode, as denoted by a period Q in the timing charts of FIG. 15A to 15E, the operator's correction instruction operations on the exposure conditions are continuously effected on one entire roll of film 2.

Incidentally, as for the image information displayed on the three right-side image information display areas 36 relative to the center, the correction instructions from the control panel 20 have been completed, yet their final exposure conditions have not yet been sent to the exposure control unit 104. Therefore, by shifting the displayed image information back to the central image information display area 36, a further correction instruction may be given for re-correcting the exposure conditions.

After the command is received at step #13 for starting acceptance of the correction information, the exposure condition computing unit 102 and the image information converter unit 103 keep copying with the correction instructions from the control panel 20 in the above-described manner. In the course of this, the controller 100, on the other hand, confirms completion of the reverse transportation of the film 2 (step #14), and then if the operation mode is now set to the correction-completed mode in which an index print is produced after completion of correction according to correction instructions (step #15), the controller effects exposure steps of steps #19 through #23 while checking if the input of correction instructions from the control panel 20 has been completed or not.

When the input of correction instructions is completed (step #16), the controller cause the image information converter unit 103 to effect a composing operation of the image information for the index print and instructs the video printer 40 to print out this composed image (step #18). In this, if additional information is selected or inputted at step #2, this additional information too is sent to the image information converter unit 103 to be printed together with the image information.

However, if the index print production has already been instructed at the time of completion of the input of correction instructions, the instruction for index print production will not be repeated (step #17).

Referring now to the exposure steps at steps #19 through #23, when the exposure control unit 104 receives the final exposure conditions from the exposure condition computing unit 102 (step #19), the frame of the film 2 is transported into the exposure optical path (step #20, step #21), and then the print paper 3 is exposed with the image information of the film 2 with controlling the shutter 15 and the light modulating filter 12 based on the exposure conditions received by the exposure control unit 104 (step #22).

Incidentally, it is conceivable that while the image information of the frame whose correction instruction has been completed is serially sent to the video printer 40, the exposure operation of this frame is effected in parallel or simultaneous manner to produce a photographic print.

Further, after one entire film amount of image information is sent to the video printer 40, the index printing operation is initiated.

Also, during an index printing operation, an exposure condition correction operation, exposure operation and image information transmitting operation of a next frame may be effected in parallel.

Accordingly, when the display mode is the 6-frame display mode or the 28-frame display mode, only after completion of the exposure condition correction instructions on the first six or twenty eight leading frames of the film 2, the exposure conditions are transmitted to the exposure control unit. Thus, as shown in the timing charts of FIGS. 14A to 14E, the exposure operation is started after lapse of the period Q needed for the exposure condition correction instructions on the first six or twenty eight frames.

On the other hand, when the display mode is the cinema view mode, the exposure operation is started, during the period Q needed for exposure condition correction instructions on the image information, at a timing upon completion of the correction instructions on the first four frames.

When the exposure control unit 104 receives the exposure conditions, the exposure of the print paper 3 and the transportation of the print paper 3 are repeatedly carried out. Then, when the exposure operations of the entire film roll 2 have been completed with leaving no further frame thereof to be exposed (step #23), this film 2 is discharged from the apparatus (step #24), whereby the entire exposure operation is completed.

[Other Embodiments]

(1) In the foregoing embodiment, the CCD image sensor 55 is employed as the reader device 50. Instead, a CCD line sensor or MOS image sensor or the like may be employed.

Further, in the foregoing embodiment, the rotary color filter 53 is used for reading image information as separated into the R, G, B components. Instead, CCD image sensors dedicated to the respective R, G, B components may be employed.

(2) In the foregoing embodiment, for simplifying the construction, the light source 11 is shared by the reader device 50 and the exposure means 5. Instead, if the reader device 50 and the exposure means 5 are provided with light sources of their own, the film need not be transported reversely after completion of reading of the film image information. As a result, the operation efficiency of the apparatus may be improved.

(3) In the foregoing embodiment, a video printer is used as the printing means 40. Instead, an alternative device may be used for printing image information of a plurality of frames of the film 2 on one sheet of print paper as one sheet of printing material by means of the projection exposure process or the so-called contact printing process. Or, a further alternative device may be employed which effects direct printing on the photosensitive material such as a print paper. In such case, for producing an index print, the exposure conditions for the index print may be determined based on the exposure conditions used in the ordinary photographic printing process. With this, an index print more similar to the photographic print may be obtained.

(4) In the foregoing embodiment, the image information converter unit 103 effects separately the composing operation of the image information to be displayed on the monitor 30 and the composing operation of the image information to be printed by the video printer 40. Instead, if the video signals outputted to the monitor 30 are transmitted as they are to the video printer 40 to be used for its printing operation, the construction of the image composer unit 110 may be rendered simple.

(5) In the foregoing embodiment, since the index print is printed by means of the video printer 40, the composite image information composed by the image composer unit 110 of the image information converter unit 103 from a plurality of frames of image information is outputted as video signals. Instead, if a color printer widely marketed for use with a computer is employed, the composite image information may be sent to the printer via various computer interfaces without the conversion into the video signals.

(6) In the foregoing embodiment, exposure conditions are obtained based on image information of frames of one entire film roll 2. Instead, exposure conditions may be determined for each frame based on the image information of this frame alone while utilizing the DX code recorded in the film 2 for example.

Figure 16:
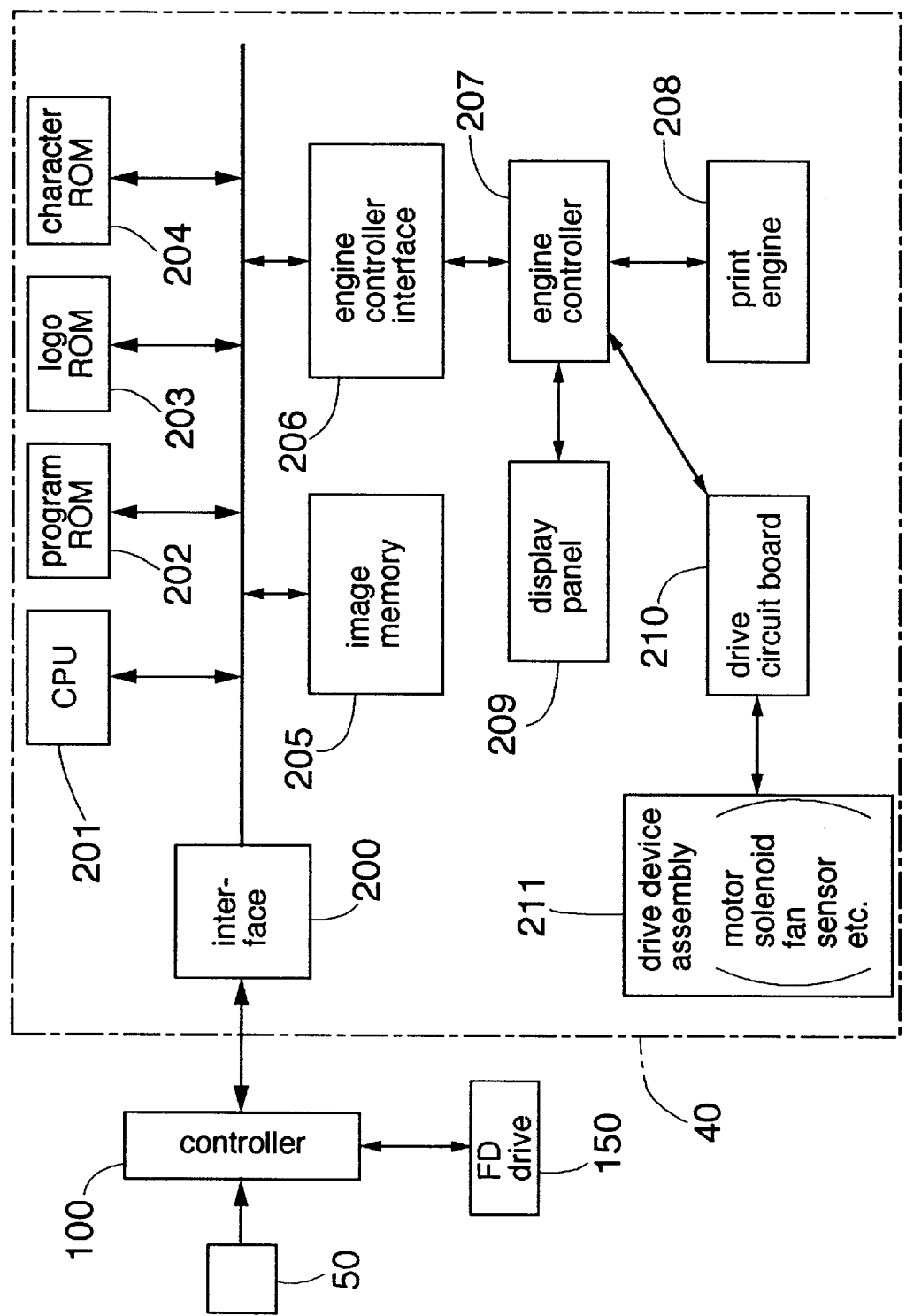
FIG. 16 is a schematic construction view relating to a further embodiment of a photographic printing apparatus according to the present invention.

(7) In the foregoing embodiment, the image composer unit 110 of the image information converter unit 103 composes image information of a plurality of frames into a single piece of composite image information and this image information is then transmitted to the video printer 40. Instead, the image information converter unit 103 may directly output the image information of respective frames to the video printer 40, so that this information may be composed into a single piece of composite image information by the video printer 40. Further alternatively, a composite printed image may be obtained by printing image information of respective frames one after another in succession on to a single printing material. FIG. 16 shows a sample construction of video printer 40 having such function, Namely, this video printer 40 shown in FIG. 16 includes a CPU 201 for executing data communication of e.g. image information with the controller 100 via an interface 200 and image processing operations in accordance with memory contents stored at a program ROM 202, a logo ROM 203 for storing additional information such as logo image information of the manufacturer of the index print, a character ROM 204 for storing further additional information comprised of character information, an image memory 205 for storing e.g. image information of the film 2 and acting also as a 'table' to be referenced for composition of the image information of the film 2 with the additional information, a drive device assembly 211 comprised of various drive devices for effecting e.g. transportation of the index print sheet 70, a drive circuit board 210 for driving the drive device assembly 211, a print engine 208 including a print head as the major component thereof, a display panel 209 for displaying e.g. a current operation condition of an index print production process, an engine controller 207 for controlling the print engine 208 and the drive circuit board 210 so as to print the image information of the film 2 and the additional information received via the engine controller interface 206 on to the index print sheet 70, and so on.

An operation of the video printer 40 having the above-described construction will be briefly described.

When the CPU 201 receives image information of the film 2 from the controller 100, the CPU 201 writes this image information into the image memory 205, reads from the logo ROM or character ROM the additional information instructed via the controller 100 from the control panel 20 or instructed directly from the control panel 20, composes this additional information and the image information of plural frames stored at the image memory 205 into a single piece of composite image information, and then sends this composite image information to the engine controller interface 206.

Then, with controlling the print engine 208 and the drive circuit board 210, the engine controller 207 prints the image information received via the engine controller interface 206 on the index print sheet 70 thereby to produce an index print.

Incidentally, the construction of the print engine 208 may vary, depending on the printing method employed, such as the thermal transfer type, heat sensitive type, CRT type, ink jet type, laser type and so on.

(8) In the foregoing embodiment, the number of frames of the image information displayed in the three display modes of the index print is six, twenty eight or seven. However, the number may increase or decrease conveniently.

(9) In the foregoing embodiment, in the cinema view mode, the enlarged display area 37 always displays image information of the central image information display area 36. Instead, if the bar-like cursor 36a is rendered operable by means of the track ball of the control panel 20, the frame to be displayed at the enlarged display area 37 may be freely selected from the plurality of image display areas 36.

(10) In the foregoing embodiment, in the sample cases of FIGS. 7 and 8 in which image information of twenty eight frames is displayed, the additional information display areas for the index print are provided at the two positions on the upper side and lower right side of the image information display area. In this respect, the disposing position and number of these additional information display areas may vary, depending on the layout of the image information, size or shape of the index print sheet, and so on.

(11) In the foregoing embodiment, the memory 106 comprises an internal memory incorporated within the controller 105. Instead, with connecting a floppy disc drive, an IC card or the like to the controller 105, this memory 106 may comprise an external memory as well. Further alternatively, the additional information may be inputted via a communication means.

(13) In the foregoing embodiment, the photographic printing apparatus 1 employs the exposure means 10 for effecting projection exposure of the image information of the film 2 on the print paper 3. Instead, without such exposure means 10, a single sheet of print for each image information may be produced by the video printer 40.

(14) In the foregoing embodiment, the video printer 40 produces the index print using a print paper dedicated to use with the video printer 40. Instead, if the video printer 40 comprises a CRT printer and image information sent from the controller 100 is displayed on the CRT and then the print paper 3 shown in FIG. 1 is exposed with this image information displayed on the CRT, no special paper is needed for the production of index print. Also, the construction of the apparatus will be rendered simple.

(15) In the foregoing embodiment, image information of a frame on which an instruction for no printing thereof has been given is excluded from the index print. Instead, the index print may include also such frame of no printing necessity. Further, in case the image of such frame on which an instruction of no printing necessity has been given or a frame which has been determined as unnecessary by the image information converter unit 103 too is sent to the video printer 40, the printer 40 may print such letters as "SKIPPED", "ABNORMAL" or "ERROR" at the corresponding frame area.

(16) The inter-frame space in the image information display area 71 may have a same base color as the index print material, but may be provided with a white bordering frame.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A photographic printing apparatus capable of printing, as an index print, an inlaid composite image having images of a plurality of film frames, said apparatus comprising:

exposure means for exposing a photosensitive material for producing a photographic print;

exposure condition computing means for computing exposure conditions to be used for printing the photosensitive material based on image information read from a film;

exposure control means for controlling said exposure means according to the exposure conditions;

index printing means for printing said inlaid composite image;

correction instruction input means for providing a correction instruction to said exposure condition computing means so that an operator can correct the exposure conditions;

a monitor for displaying the read image information; and image information converter means for providing a monitor image signal to display the read image information on said monitor, said image information converter means having a first function, a second function and a third function, wherein said first function provides a simulated image from the read image information which simulated image is expected to be produced on the photosensitive material when the photosensitive material is exposed under the exposure conditions, said second function provides monitoring image information for displaying said simulated image on said monitor, and said third function provides index-printing image information for printing said simulated image by said index printing means.

2. A photographic printing apparatus as defined in claim 1, wherein said index-printing means prints said index-printing image information on a printing material which is different from said photosensitive material.

3. A photographic printing apparatus as defined in claim 1, wherein the apparatus allows selection between a correction-completed mode in which the index printing process by said index-printing means is effected only after reception of a correction instruction from said correction instruction input means, and a correction-uncompleted mode in which the index printing process by said index-printing means is effected without any correction.

4. A photographic printing apparatus as defined in claim 1, wherein said image information converter means includes an image composer for producing said inlaid composite image information from the simulated image, and wherein image information of said inlaid composite image is sent to said index printing means as said index printing image information.

5. A photographic printing apparatus as defined in claim 4, further comprising:

additional information input means for inputting additional information to be added in the index print;

wherein said image composer composes the inputted additional information with the composite image information.

6. A photographic printing apparatus as defined in claim 1, wherein said index printing means includes an image composer for composing the index printing image information sent from said image information converter means for producing said inlaid composite image.

7. A photographic printing apparatus as defined in claim 6, further comprising:

additional information input means for inputting additional information to be added in the index print;

wherein said image composer composes the inputted additional information with the composite image information.

8. An index printer as defined in claim 7, further comprising:

a memory for storing kinds of the additional information which may be inputted from said additional information input means; and designating means for designating the kinds of the additional information to be inputted from said additional information input means.

9. An index printer as defined in claim 8, wherein said additional information includes character information and image information.

* * * * *